UNITED STATES PATENT OFFICE.

JOSHUA S. STOWMAN, OF BALTIMORE, MARYLAND.

IMPROVEMENT IN PRESERVING GREEN COFFEE.

Specification forming part of Letters Patent No. 201,848, dated March 26, 1878; application filed December 31, 1877.

*To all whom it may concern:*

Be it known that I, JOSHUA S. STOWMAN, of Baltimore city, State of Maryland, have invented a new and Improved Process of Treating Green Coffee; and I do hereby declare that the following is a full, clear, and exact description of the same.

The object of my invention is to improve the style and appearance of green coffee, to preserve the same against the effects of the weather, and to render it better adapted to subsequent preparation in the form of a beverage.

To this end the invention consists in treating the coffee-beans (previously cleaned from dust, &c.) with an aqueous solution of one of the vegetable gums, such as gum-arabic, gum-senegal, or gum-tragacanth, and agitating the beans, by revolution in a cylinder or otherwise, until the superficial coating shall have become absorbed and dried in.

In carrying out my invention I employ, preferably, gum-arabic, of which I use about one pound to a gallon of water, more or less of the gum being added, according to the character of the coffee to be treated. With this solution the coffee, after being previously cleaned, is treated by being immersed therein, then drained, and afterward placed in a receptacle of any suitable kind, and agitated or stirred until its coating of the solution is absorbed and dried in. A revolving cylinder is well adapted to the last step of the process, and is preferably employed.

Instead of immersing the coffee-beans in the solution, the solution may be blown into or sprinkled upon the beans during the stirring or agitation of the beans.

The result attained by my process is to both improve the style and appearance of the coffee, and to preserve and improve its qualities. When applied to good coffee it closes up the pores and forms a protective coating, which operates to preserve the aroma of the coffee, and prevent the loss of weight due to the drying and evaporation of the water of vegetation. By preventing the loss in weight it permits the coffee to be stored and kept in places where it could not be otherwise kept without depreciation. To prevent this loss in weight coffee is usually stored in cellars or other damp places; but the objection to this is that the same dampness which prevents the drying of the bean causes also mold and mustiness on the same.

My process, it will be seen, prevents the coffee from drying, and without the necessity of storing it in a damp place. When applied to coffee which has already depreciated in value from drying, also, it closes the pores and stops further loss of weight and aroma, and secures, also, another advantage, hereinafter named.

I am aware of the fact that gums and other gelatinous substances have been applied to coffee after it is roasted, and I therefore make no broad claim to treating coffee with gum; but when the gum is applied to green coffee, or before it is roasted, it has a different and more valuable effect, in that it causes the beans to pass through the roasting process without losing the aroma, which, to a large extent, is otherwise driven off by the heat, and which cannot be restored by subsequent treatment of the bean.

When dry or brittle coffee is roasted it is rendered so much drier that when ground for use it is reduced to a powder, instead of disintegrating in grains, and this makes a muddy coffee. By treating dry or brittle coffee while in an unroasted or green state the gum is dried and thickened in the pores of the bean, where it gives toughness to the bean, and obviates the objection just mentioned.

Subsequent treatment of the roasted bean with gum will not effect this result, because the gum is not thickened into a hard mass by the roasting, and hence as soon as boiling water is poured on the same it dissolves and allows the fine particles to float loosely.

In practicing my invention only such gums as are soluble in water can be made practicably available, as, if others were employed which are soluble in alcohol, for instance, the use of the latter would be too expensive, and, if used, the gums soluble in alcohol and not in water would prevent the extractive principles of the coffee from being thoroughly dissolved in making coffee for the table.

In connection with the solution of the gum in water I may employ any harmless coloring matter to give a particular shade to the beans.

Having thus described my invention, what I claim as new is—

The process of treating green coffee, for the purpose set forth, which consists in coating the green coffee-beans with a vegetable gum in aqueous solution, and subsequently drying the coating thus applied, substantially as described.

JOSHUA S. STOWMAN.

Witnesses:
CARROLL WINCHESTER,
EDW. H. WHITE.